United States Patent
Roesch et al.

(10) Patent No.: US 7,798,025 B2
(45) Date of Patent: Sep. 21, 2010

(54) SENSOR CIRCUIT FOR MEASURING A MEASURING QUANTITY

(75) Inventors: Olaf Roesch, Munich (DE); Ralf Schledz, Zolling (DE)

(73) Assignee: Infineon Technologies AG, Munich (DE)

( * ) Notice: Subject to any disclaimer, the term of this patent is extended or adjusted under 35 U.S.C. 154(b) by 763 days.

(21) Appl. No.: 11/716,403

(22) Filed: Mar. 9, 2007

(65) Prior Publication Data

US 2007/0222496 A1  Sep. 27, 2007

(30) Foreign Application Priority Data

Mar. 10, 2006  (DE) .................. 10 2006 011 239

(51) Int. Cl.
*G01D 7/02* (2006.01)

(52) U.S. Cl. .................................................. 73/866.1

(58) Field of Classification Search .................. 438/14, 438/17; 73/866.1
See application file for complete search history.

(56) References Cited

U.S. PATENT DOCUMENTS 5,446,444 A * 8/1995 Lease ..................... 340/514
5,854,564 A 12/1998 Darmawaskita et al. ....... 327/78
2003/0186471 A1* 10/2003 Shi et al. ..................... 438/14
2008/0213956 A1* 9/2008 Black et al. ................. 438/197

FOREIGN PATENT DOCUMENTS

| CA | 2325885 A1 | 10/1998 |
| DE | 697 22 041 T2 | 3/2004 |
| DE | 103 21 490 B2 | 10/2004 |
| DE | 699 27 709 T2 | 6/2006 |
| EP | 0079 955 B1 | 2/1990 |
| GB | 2 419 950 A1 | 5/2006 |

* cited by examiner

*Primary Examiner*—Hezron Williams
*Assistant Examiner*—Tamiko D Bellamy
(74) *Attorney, Agent, or Firm*—Maginot, Moore & Beck (57) ABSTRACT

A sensor circuit has a first input terminal, a second input terminal and an output terminal, a capacitive sensor connected between the first input terminal and the output terminal, a field-effect transistor coupled to the output terminal at one of a source and a drain terminal and coupled to the second input terminal at the other one of the source and drain terminals, and a driver implemented to set a potential at a control terminal of the field-effect transistor such that in sensor operation the field-effect transistor is operated in a subthreshold voltage range.

23 Claims, 4 Drawing Sheets

SENSOR CIRCUIT FOR MEASURING A MEASURING QUANTITY

CROSS-REFERENCE TO RELATED APPLICATIONS

This application claims priority from German Patent Application No. 10 2006 011 239.3, which was filed on Mar. 10, 2006, and is incorporated herein by reference in its entirety.

TECHNICAL FIELD

The present invention relates to a sensor circuit for measuring a measuring quantity and for outputting an output signal indicating the measuring quantity and, in particular, to a sensor circuit including a capacitive sensor changing its capacitance value in dependence on a measuring quantity.

BACKGROUND

Electret microphones or silicon microphone modules are being employed with increasing frequency in electrical devices used for communications between several parties, such as, for example, microphones. The silicon microphone modules here may be manufactured easily in a mass-production process of a semiconductor company. This allows manufacturing silicon microphone modules in great numbers at low manufacturing costs.

The silicon microphone modules or electret microphones typically comprise a passive voltage supply across resistors. Thus, the resistance must be selected to be very high so that the value of the resistor used will be in a range from 10 GΩ to several 10 GΩ, since a combination or connection of the microphone capacitance and the resistor is to produce or form a high pass having a very low cutoff frequency for an output signal of the sensor circuit.

At the same time, the electrical high pass for the output signal of the sensor circuit acts as a low pass for a disturbing noise, such as, for example, thermal noise of the resistor. If the cutoff frequency is far below the frequency of the useful band, the disturbing noise will be filtered out, the result being an improvement in the signal-to-noise distance. The resistor used should also for this reason have a high value.

The resistor in the series connection comprising the microphone which is used for the voltage supply of the microphone has been implemented so far as an external device or an integrated polysilicon resistor. However, both resistor implementations entail disadvantages. The resistor implementation as an external device causes additional manufacturing costs which, for example, result from the fact that the additional component of the external resistor is to be arranged on a board on which the microphone is arranged. At the same time, further stocking of an additional component, i.e. the external resistor, produces additional logistic expenses for stocking this additional external component for a manufacturer of devices employing the microphones interconnected with the external resistors. The additional logistic expenses produce additional expenses and thus costs for the manufacturer of a device comprising such a voltage supply.

At the same time, an implementation of the resistor used in the voltage supply of the microphone as an internal resistor, exemplarily on a chip, in the form of a lightly doped polysilicon which is used as a resistor material is flawed by considerable disadvantages. In order to produce a resistor having such a high total resistance, a high number of resistor squares are to be implemented on the chip, entailing considerable chip area consumption. At the same time, a series resistor implemented in this way typically having such a high resistance is technologically difficult to manufacture and, above all, very difficult to reproduce in mass production. The result is that in mass production considerable variation of the series resistor value in microphone devices produced in this way result from variations of the process parameters so that a considerable portion of the microphone devices produced in this way does not have the specified values for the series resistor and must be discarded after a microphone device test. Due to the high portion of microphone devices to be discarded, the manufacturing costs for the microphone devices comprising a lightly doped polysilicon resistor as a series resistor are increased.

An additional disadvantage of the series resistor implementation as a polysilicon resistor is that such a high-resistance polyresistor and/or polysilicon resistor has a strong temperature trend. This is of particular disadvantage in mobile phones used both at low temperatures in winter and with strong solar irradiation, since the microphone devices implemented therein having a polysilicon resistor which is used for a voltage supply have a strong temperature trend, the result being that the electrical performance of the microphone and thus the sensitivity of the sensor implemented in this way for receiving sound vary strongly in dependence on the temperature.

SUMMARY

According to an embodiment, a sensor circuit for measuring a measuring quantity and for outputting an output signal indicating the measuring quantity may have a first input terminal, a second input terminal and an output terminal, wherein the measuring quantity may be output at the output terminal, a capacitive sensor connected between the first input terminal and the output terminal and implemented to change a capacitance value in dependence on a measuring quantity, a field-effect transistor coupled to the output terminal at one of a source and a drain terminal and coupled to the second input terminal at the other one of the source and drain terminals, and driving means implemented to set a potential at a control terminal of the field-effect transistor such that in sensor operation in which the output signal is generated the field-effect transistor is operated in a sub-threshold voltage range.

Embodiments of the present invention are based on the finding that a field-effect transistor operated in a sub-threshold voltage range may be used as a resistor having a high resistance in a series connection with a capacitive sensor in a sensor circuit.

Embodiments of the inventive sensor circuit in which in sensor operation the field-effect transistor is operated in a sub-threshold voltage range and connected in series with the capacitive sensor are characterized in that the process parameter variations occurring in the manufacturing process of the sensor circuit only have a smaller effect on a value of the resistor between the source or the drain terminal than the effect of the process parameter variations in the conventional sensor circuit on the value of a passive resistor implemented in this way. Thus, an electrical performance of embodiments of the inventive sensor circuit is influenced to a lesser extent by the variations of the process parameters and thus may be reproduced better. The electrical performance of embodiments of the inventive sensor circuit thus depends less on the technological possibilities and/or variations in the manufacturing process than that of a conventional sensor circuit in which the series resistor is implemented as a passive resistor. Sensor circuits having capacitive sensors which are easier and cheaper to manufacture than conventional sensor circuits comprising capacitive sensors can be provided in this way.

Due to the fact that the variations in the process parameters in embodiments of the inventive sensor circuit have a smaller effect on the electrical performance than in conventional sensor circuits and/or microphone circuits, a portion of sensor circuits having an electrical performance in a specified range during a test after manufacturing is greater than in conventional microphone circuits. Thus, the portion of these inventive sensor circuits which have to be discarded after production, for example, at a front-end position is reduced, resulting in a decrease in the manufacturing costs of the inventive sensor circuit compared to the conventional sensor circuit comprising an external series resistor or a polysilicon resistor.

In addition, embodiments of the inventive sensor circuit are of advantage in that a field-effect transistor the operating point of which is set by a special control circuit so that it will be operated in the sub-threshold voltage range and/or sub-threshold range, is more temperature-stable than the passive resistor in the conventional microphone circuit. Thus, the electrical performance of these inventive sensor circuits is more stable in relation to thermal influences, which has the result, exemplarily in mobile phones in which capacitive sensor circuits are used for converting sound to an electrical signal, that a sensor sensitivity dependence on the temperature at which the mobile phone is operated is reduced.

BRIEF DESCRIPTION OF THE DRAWINGS

Embodiments of the present invention will be detailed subsequently referring to the appended drawings, in which.

DETAILED DESCRIPTION

Figure 1:
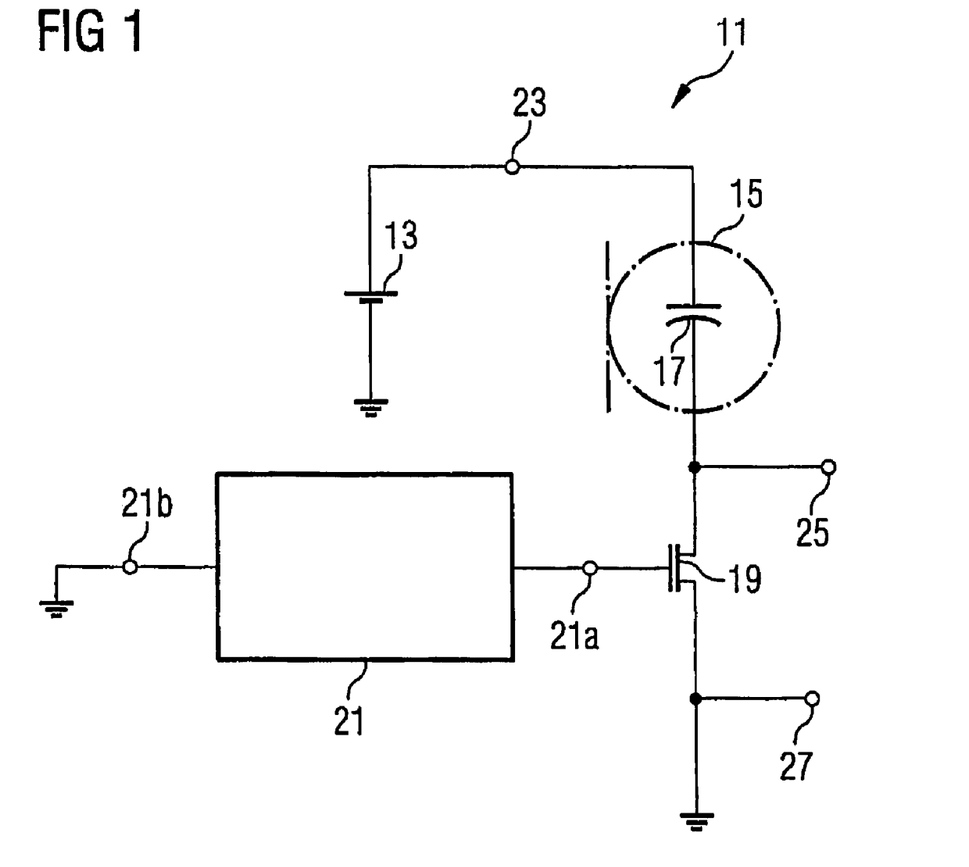
FIG. 1 shows a microphone circuit according to an embodiment of the present invention.

FIG. 1 shows a setup of a microphone circuit 11 according to an embodiment. The microphone circuit 11 according to the embodiment of the present invention comprises a voltage supply element 13, a microphone 15 having a microphone capacitance 17, a MOS transistor 19 and operating point setting means 21. A first input terminal 23, an output terminal 25 and a ground terminal or second input terminal 27 are arranged in the microphone circuit 11.

The voltage supply element 13 is coupled to the ground terminal 27 at a pole, whereas the voltage supply element 13 is connected to the first input terminal 23 in an electrically conducting way at another pole. In addition, a first terminal of the microphone capacitance 17 is connected to the first input terminal 23 and a second terminal of the microphone capacitance 17 to the output terminal 25 in an electrically conducting manner. At the same time, the second terminal of the microphone capacitance 17 is connected to a drain terminal of the MOS transistor 19 in an electrically effective manner, whereas a source terminal of the MOS transistor 19 is connected to the ground terminal 27 in an electrically conducting manner. An output of the operating point setting means 21 is connected to a control terminal or gate terminal of the MOS transistor 19 at a first setting means terminal 21a in an electrically conducting manner. At the same time, the operating point setting means 21 is connected to ground at a second setting means terminal 21b.

The voltage supply element 13 provides a direct voltage serving the energy supply of the microphone circuit 11 according to an embodiment of the present invention. As a consequence of a change in air pressure at the microphone 15 and/or sound impinging on the membrane of the microphone, a capacitance value of the microphone capacitance 17 changes. The deflections of the membrane resulting from the sound and/or the changes in the microphone capacitance result in an alternating current flowing at the first input terminal 23 the amplitude and frequency of which depend on the intensity of the sound impinging on the microphone and the sound frequency.

The operating point setting means 21 sets a potential at the gate terminal of the MOS transistor 19, wherein the potential at the gate terminal is defined by a potential difference compared to the ground terminal or reference potential terminal 27. The operating point setting means 21 thus sets a resistance between the source terminal and the drain terminal of the MOS transistor 19 via the potential at the gate terminal of the MOS transistor 19. Setting the potential at the gate terminal of the MOS transistor 19 thus takes place such that in sensor operation where a sensor signal is produced at the output terminal 25 the MOS transistor 19 will always or permanently be operated in a sub-threshold voltage range. The operation of a MOS transistor and/or a field-effect transistor in a sub-threshold voltage range will be discussed in greater detail in the course of the application.

A resistance between the source terminal and the drain terminal of the MOS transistor 19 depends on a dimensioning of the channel region of the MOS transistor 19. The resistance between the source terminal and the drain terminal will thus be the higher, the greater the length of the channel region and the smaller the width of the channel region.

As has already been mentioned, in the microphone circuit 11 the MOS transistor 19 is driven by a corresponding setting of the control voltage set by the operating point setting means 21 and/or a potential difference between the gate terminal and the ground terminal 27 such that it will be operated in the sub-threshold voltage range, the result being a higher resistance forming between the source terminal and the drain terminal. Here, the resistance between the source terminal and the drain terminal of the MOSFET has a value which, for example, is in a range from 1 G$\Omega$ to 100 G$\Omega$, since the channel region of the MOS transistor 19 is dimensioned such that the channel region is long and narrow.

In summary, the active supply concept or the energy supply or voltage supply settable via the MOS transistor 19 shown in FIG. 1 employs a high-resistance resistor which is based on using the channel resistance and/or the resistance between the source terminal and the drain terminal of the MOS transistor 19 when operating in the sub-threshold voltage range.

The microphone capacitance 17 and the resistor between the source terminal and the drain terminal of the MOS transistor 19 are interconnected such that they form a high pass, wherein an input or input port of the high pass is formed between the first input terminal 23 and the ground terminal 27 and an output or output port is formed between the source terminal and the drain terminal of the MOS transistor 19. The cutoff frequency of the high pass formed in this way thus depends on the value of the resistance between the source terminal and the drain terminal of the MOS transistor such that the cutoff frequency of the high pass depends on the length of the channel region, the width of the channel region of the MOS transistor 19 and the potential applied to the gate terminal of the MOS transistor 19.

Figure 2:
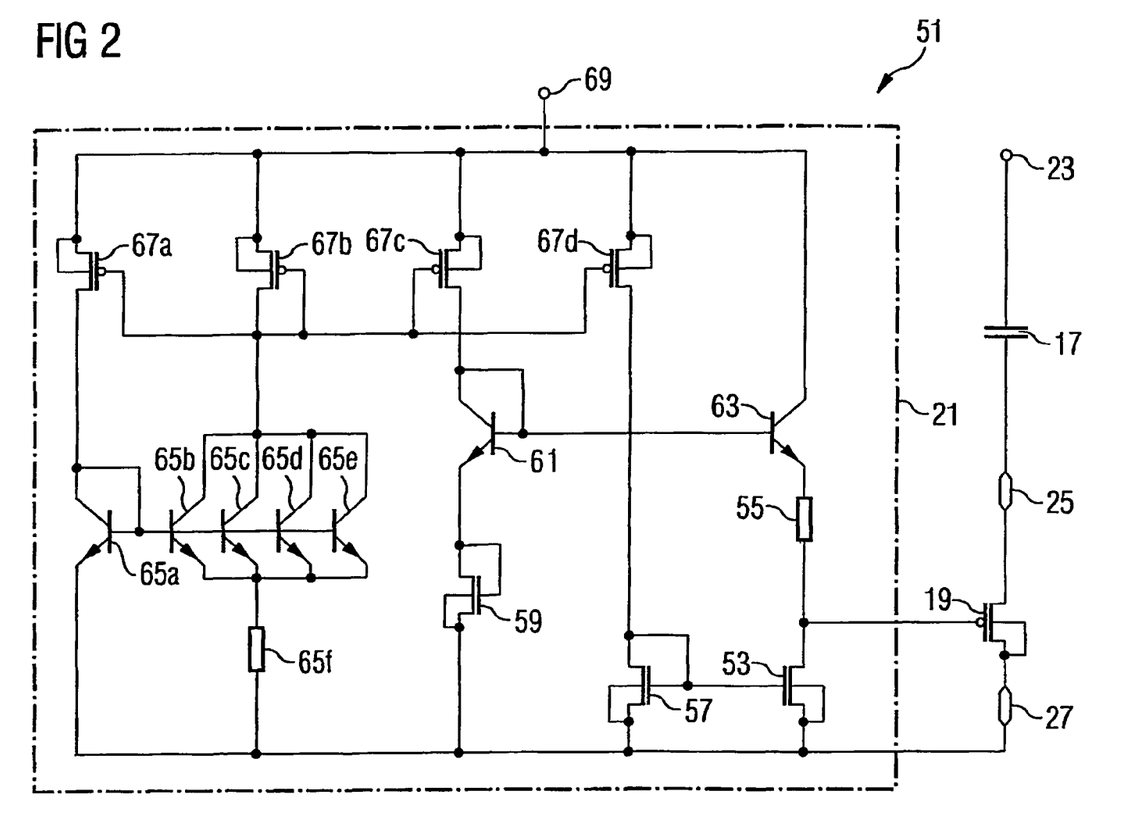
FIG. 2 shows a specific embodiment of the embodiment of the present invention shown in FIG. 1.

FIG. 2 shows a special embodiment 51 of the microphone circuit 11 according to an embodiment of the present invention. Subsequently, similar elements or elements having a similar effect to the microphone circuit 11 according to the embodiment of the present invention shown in FIG. 1 are provided with the same reference numerals. Furthermore, a description of the setup and function of the special embodiment 51 of the microphone circuit relates to the setup and function of the embodiment of the operating point setting means 21.

The gate terminal of the MOS transistor 19 is coupled to a drain terminal of a setting field-effect transistor 53. A source terminal of the setting field-effect transistor 53 is connected to a bulk terminal of the field-effect transistor 53 in an electrically effective manner and, at the same time, coupled to the ground terminal 27. The drain terminal of the setting field-effect transistor 53 is connected to a first terminal of a series resistor 55 in an electrically conducting manner. A gate terminal of the setting field-effect transistor 53 is connected to a gate terminal and a drain terminal of a setting mirror field-effect transistor 57 in an electrically conducting manner. A source terminal and a bulk terminal of the setting mirror field-effect transistor 57 are coupled to the ground terminal 27. A bulk terminal and a source terminal of an establishing field-effect transistor 59 are connected to the ground terminal 27 in an electrically conducting manner. A gate terminal of the establishing field-effect transistor 59 is coupled to a drain terminal of the transistor 59 and to an emitter terminal of a first mirror transistor 61. A base terminal of the first mirror transistor 61 is connected to a collector terminal of the first mirror transistor 61 and to a base terminal of a second mirror transistor 63 in a conducting manner. An emitter terminal of the second mirror transistor 63 is connected to a second terminal of the series resistor 55 in an electrically effective manner.

An emitter terminal of a first constant current transistor 65*a* is connected to the ground terminal 27 in an electrically conducting manner, while a base terminal of the first constant current transistor 65*a* is connected to a base terminal of a second constant current transistor 65*b*, a base terminal of a third constant current transistor 65*c*, a base terminal of a fourth constant current transistor 65*d* and a base terminal of a fifth constant current transistor 65*e* in a conducting manner. In addition, the base terminal of the first constant current transistor 65*a* is connected to a collector terminal of the first constant current transistor 65*a* in an electrically effective manner. Emitter terminals of the second to fifth constant current transistors 65*b-e* are interconnected and connected to a first terminal of a constant current source resistor 65*f* in an electrically conducting manner, a second terminal of the constant current source resistor 65*f* being electrically coupled to the ground terminal 27. The collector terminals of the second to fifth constant current transistors 65*b-e* are interconnected.

The collector terminal of the transistor 65*a* is connected to a drain terminal of a first current-multiplying transistor 67*a* in an electrically effective manner. A source terminal and a bulk terminal of the first current-multiplying transistor 67*a* are connected to a supply terminal 69 in an electrically conducting manner. A gate terminal of the first current-multiplying transistor 67*a* is connected to the gate terminals of a second 67*b*, a third 67*c* and a fourth 67*d* current-multiplying transistor in a conducting manner. Bulk terminals and source terminals of the second to fourth current-multiplying transistors 67*b-d* are each interconnected and coupled to the supply terminal 69. The drain terminal of the second current-multiplying transistor 67*b* is connected to the collector terminals of the constant current transistors 65*b-e* and to the gate terminal of the second current-multiplying transistor 67*b*. A drain terminal of the third current-multiplying transistor 67*c* is coupled to a collector terminal of the first mirror transistor 61, while a drain terminal of the fourth current-multiplying transistor 67*d* is connected to the drain terminal of the setting mirror field-effect transistor 57 in a conducting manner. A collector terminal of the second mirror transistor 63 is coupled to the supply terminal 69.

The establishing field-effect transistor 59 is connected as a diode and dimensioned such that a voltage drop between the source terminal and the gate terminal of the field-effect transistor 59 is thus established to a predetermined value, advantageously in the sub-threshold voltage range close to the threshold voltage of the establishing field-effect transistor 59. The first mirror transistor 61 and the second mirror transistor 63 are dimensioned such that the emitter voltage values are approximately equal so that a voltage drop between the emitter terminal of the first mirror transistor 61 and the ground terminal and a voltage drop between the emitter terminal of the second mirror transistor 63 and the ground terminal 27 are equal.

Put differently, the transistors 61, 63 copy a voltage drop between the gate terminal and the source terminal of the establishing field-effect transistor 59 to a voltage drop between the second terminal of the series resistor 55 and the ground terminal 27. The voltage drop between the second terminal of the series resistor 55 and the ground terminal is thus divided into a voltage drop at the series resistor 55 and a voltage drop between the drain terminal and the source terminal of the setting field-effect transistor 53 so that the series resistor 55 serves as a voltage reducer to reduce the control voltage between the gate terminal of the MOS transistor 19 and the ground terminal to the value necessary and/or desired.

The operating point setting of the MOS transistor 19 thus takes place by means of the constant current transistors 65*a-e* and the constant current source resistor 65*f* which are interconnected such that they form a constant current source the current of which is advantageously proportional to an absolute temperature, current-multiplying means formed of the current-multiplying transistors 67*a-d*, and a process-compensated voltage generation and/or a process-compensated voltage source implemented in the form of the field-effect transistor 59. The field-effect transistor here is implemented as a shorter MOS transistor of the same kind as the MOS transistor 19, i.e. a MOS transistor comprising the same structural setup as the MOS transistor 19, however differing in the length of the channel region. Thus, the establishing field-effect transistor 59 comprises a smaller length of the channel region or a greater width of the channel region than the MOS transistor 19.

The operating point setting in the special embodiment 51 of the microphone circuit is performed such that the potential at the control terminal of the MOS transistor 19 is set such that in sensor operation where an output voltage is applied between the output terminal 25 and the ground terminal 27 the MOS transistor 19 operates in a sub-threshold voltage range, whereby its channel resistance or resistance of the channel region or resistance between the source terminal and the drain terminal has a high value.

Figure 3A:
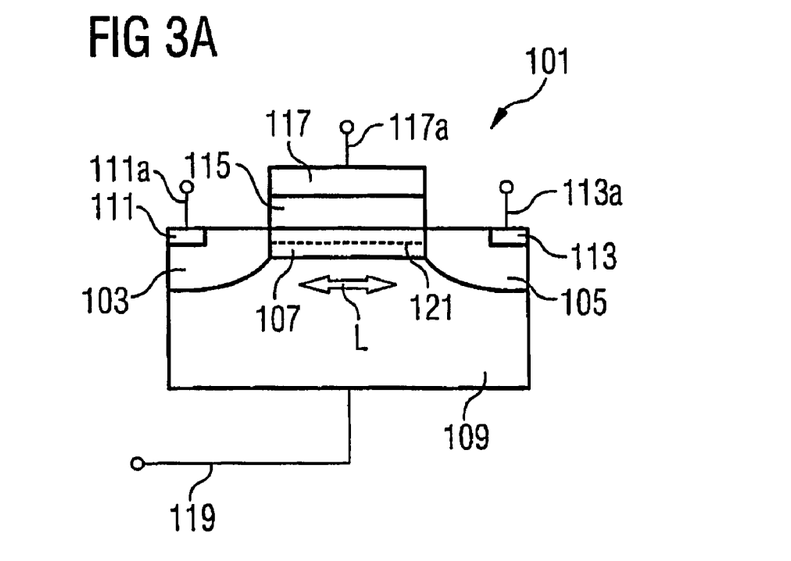
FIG. 3a shows a setup of a field-effect transistor employed in the inventive microphone circuit.

FIG. 3*a* illustrates a setup of a field-effect transistor 101 and an arrangement of the layers forming when operating the field-effect transistor 101 in the sub-threshold voltage range using a schematic cross-sectional view. The field-effect transistor 101 comprises a source region 103, a drain region 105, a channel region 107 and a substrate 109. The source region 103 and the drain region 105 are disposed on the substrate 109, whereas the channel region 107 is formed between the source region 103 and the drain region 105. In the source region 103, a source contacting region 111 on which the source contact 111a is arranged is formed, whereas in the drain region 105 a drain contacting region 113 on which the drain contact 113a is arranged is formed. An insulating layer 115 on which in turn the gate electrode 117 is arranged is arranged on the channel region 107. A gate electrode contact 117a is arranged on the gate electrode 117. A substrate terminal 119 is arranged on the substrate 109. The channel region 107 has a length L and extends into the plane of the drawing over a width B not shown here. There are three operating modes or three operating regions of the field-effect transistor 101 depending on a potential at the gate electrode 117 and/or a voltage between the gate electrode contact 117a and the substrate terminal 119 for an operation of the field-effect transistor 101 shown.

Of the three operating modes, an operation of the field-effect transistor 101 in the sub-threshold voltage range is to be discussed in greater detail. With such an operation of the field-effect transistor 101, the voltage between the gate electrode contact 117a and the substrate terminal 119 is set such that the voltage is still below a so-called threshold voltage $V_t$ and thus a channel 121 forms in the channel region 107. Thus, when operating the field-effect transistor 101 in the sub-threshold voltage range, the concentration of the charge carriers in the channel 121 is smaller than the concentration of the charge carriers of an opposite sign to the charge carriers in the channel 121 and/or the concentration of the charge carriers free to move in the channel region 107. If the value of the voltage between the gate electrode contact 117a and the substrate terminal 119 corresponds to the value of the threshold voltage $V_t$, it will be true that the concentration of the charge carriers in the channel 121 equals the concentration of the charge carriers free to move in the channel region 107. When operating the field-effect transistor 101 in the sub-threshold voltage range, the resistance between the source contact 111a and the drain contact 113a will be very high due to the low charge carrier concentration in the channel 121 and/or the inversion layer.

Figure 3B:
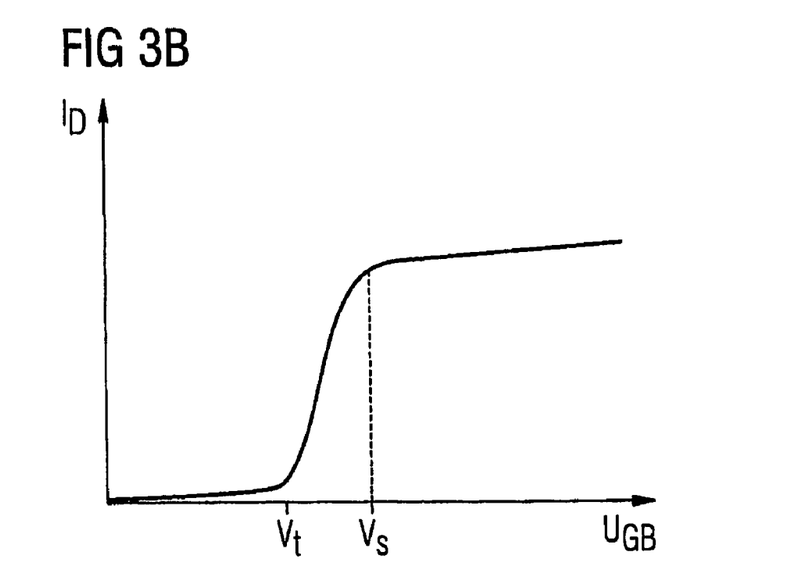
FIG. 3b shows a characteristic curve discussing a dependence of a current at a drain terminal on a voltage between a gate terminal and a source terminal in the field-effect transistor.

FIG. 3b discusses a form of a current $I_D$ at the drain contact 113a in dependence on a voltage between the gate electrode contact 117a and the substrate terminal 119. A value of the voltage $U_{GB}$ between the gate electrode contact 117a and the substrate terminal 119 is plotted on the x axis, whereas the value of the current $I_D$ at the drain contact 113a is plotted on the y axis. It is assumed for the characteristic curve of the form of the current $I_D$ illustrated in FIG. 3b that the voltage between the source contact 111a and the drain contact 113a is constant.

If the voltage $U_{GB}$ is in a range from 0 volts to the threshold voltage $V_t$, the current $I_D$ will only increase slightly with an increasing voltage $U_{GB}$ between the gate electrode contact 117a and the substrate terminal 119. As soon as the voltage $U_{GB}$ between the gate electrode contact 117a and the substrate terminal 119 exceeds the threshold value $V_t$, it will increase in a manner linear and/or proportional to the voltage between the gate electrode contact 117a and the substrate terminal 119 so that this mode is referred to as linear operating mode or linear operating range of the field-effect transistor. If the voltage between the gate electrode contact 117a and the substrate terminal 119 exceeds a saturation threshold $V_s$ or a saturation voltage $V_s$, the current $I_D$ will only increase slightly or no longer with an increasing voltage between the gate electrode contact 117a and the substrate terminal 119.

In embodiments of the inventive sensor circuit, the MOS transistor 19 is operated in the sub-threshold voltage range so that the current $I_D$ at the drain terminal and/or the current flowing between the drain terminal and the source terminal of the MOS transistor 19 is relatively small and a high resistance forms between the source terminal and the drain terminal in the MOS transistor 19.

Figure 4:
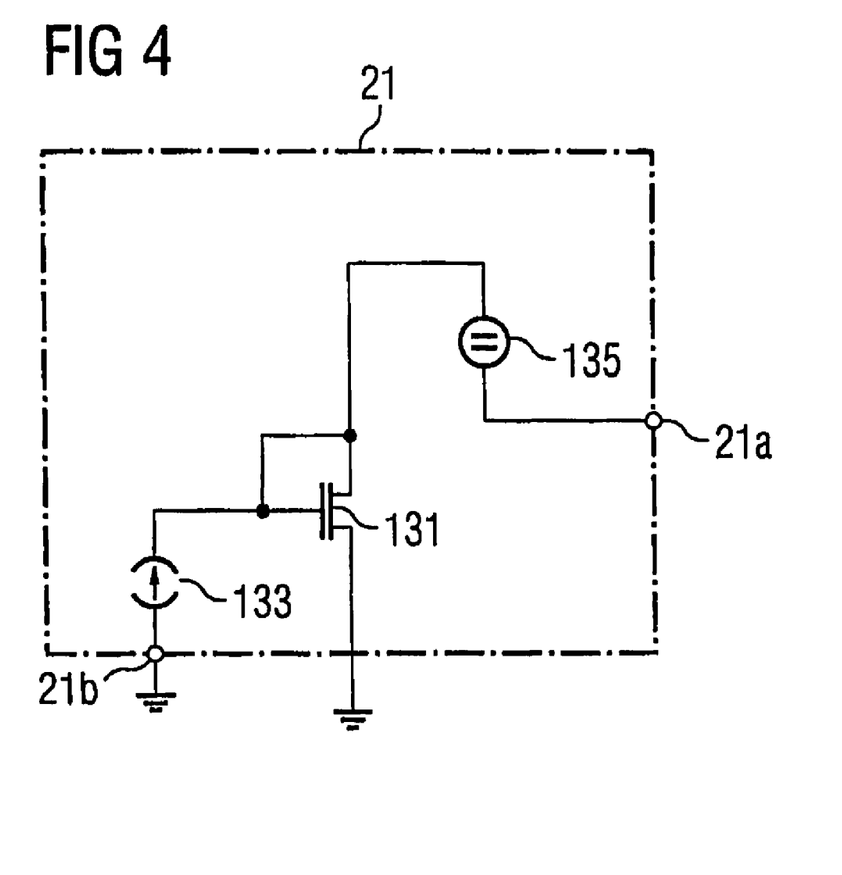
FIG. 4 shows a specific embodiment of means for setting the operating point of a MOS transistor in the microphone circuit shown in FIG. 1.

FIG. 4 discusses another specific embodiment of the operating point setting means 21 discussed in the microphone circuit in FIG. 1. The operating point setting means 21 comprises an operating point field-effect transistor 131 or operating point setting field-effect transistor 131, a constant current source 133 and a voltage source 135. Thus, a gate terminal or control terminal of the operating point field-effect transistor 131 or establishing transistor is connected to a drain terminal of the operating point field-effect transistor 131 in an electrically conducting manner and at the same time coupled to a first terminal of the voltage source 135. A second terminal of the voltage source 135 is connected to the first setting means terminal 21a in a conducting manner. A source terminal of the operating point field-effect transistor 131 is connected to a ground terminal in an electrically effective manner, whereas a first terminal of the constant current source 133 and/or current source is connected to the gate terminal of the operating point field-effect transistor 131 and the second terminal of the constant current source 133 is connected to the ground terminal via the second setting means terminal 21b in an electrically conducting manner.

As has been discussed above, the operating point setting means 21 serves to set a potential at the gate terminal of the MOS transistor 19 and/or a bias voltage such that the MOS transistor 19 is operated in the sub-threshold range to realize a process- and/or temperature-independent resistor in the microphone circuit 11.

The constant current source 133 thus advantageously is implemented such that the operating point field-effect transistor 131 is operated in a sub-threshold range close to the threshold voltage of the operating point field-effect transistor 131. The voltage source 135 changes the potential at the control terminal of the MOS transistor 19 such that, between the control terminal of the MOS transistor 19 and the ground terminal 27, there will be a voltage between the source terminal and the gate terminal of the operating point field-effect transistor 131 reduced by the voltage of the voltage source 135. Advantageously, the voltage of the voltage source is selected such that the MOS transistor 19 is operated far below or more than 100 mV below its characteristic threshold voltage.

A temperature coefficient of the voltage source 135 here is advantageously selected such that the temperature coefficient is proportional to an absolute temperature at the operating point field-effect transistor 131 so that the potential at the control terminal of the MOS transistor 19 is set such that a temperature dependence of the channel resistance and/or the resistance between the source terminal and the drain terminal of the MOS transistor 19 is compensated as completely as possible.

In the microphone circuit 11, the microphone 15 is used to convert the sound to an electrical signal, the microphone 15 advantageously being implemented as a silicon microphone module or an electret microphone. Alternatively, however, the microphone 15 in the sensor circuit 11 may be replaced by any capacitive sensor, such as, for example, a pressure sensor or even a capacitive level sensor changing the capacitance value between the first input terminal 23 and the output terminal 25 in dependence on a measuring quantity.

Additionally, in the microphone circuit 11 and/or the embodiment 51, the MOS transistor 19 may alternatively be replaced by any field-effect transistor, such as, for example, an MIS-FET (metal isolator semiconductor field-effect transistor). In the microphone circuit 11 according to an embodiment of the present invention, a width of the channel region of the field-effect transistor and/or the MOS transistor 19 advantageously is in a range from 100 nm to 5 µm, however any dimensions of the width B may be used alternatively. Furthermore, a length L of the channel region of the MOS transistor 19 advantageously is in a range from 100 µm to 4,000 µm, however any lengths of the channel region may be used alternatively. In the microphone circuit 11, a battery is exemplarily used as a voltage supply element, however any elements for supplying energy to the microphone circuit 11, which exemplarily also serve for setting the operating point of the microphone circuit, may be used alternatively. Here, a series connection of a direct voltage source and an alternating voltage source is also conceivable so that an alternating signal at the output terminal 25 and/or an alternating voltage between the output terminal 25 and the ground terminal 27 is modulated by a time-variable capacitance 17 of the microphone 15. Alternatively, the ground terminal 27 may also be replaced by any reference potential terminal.

In the microphone circuit 11, the operating point setting means 21 sets the potential at the control terminal of the MOS transistor advantageously such that, when operating the sensor and/or when the output signal is generated at the output terminal 25, a value of the resistance between the source terminal and the drain terminal advantageously will be in a range from 100 MΩ to 1 TΩ. In the microphone circuit 11 shown in FIG. 1, the operating point setting means 21 is advantageously implemented such that it sets a gate voltage and/or a voltage between the gate terminal of the MOS transistor 19 and the ground terminal 27 such that when operating the microphone circuit 11 or in sensor operation, the gate voltage is in a range of greater than 100 mV.

Advantageously, the operating point setting means 21 sets the potential at the control terminal of the MOS transistor 19 such that the resistance between the source terminal and the drain terminal in sensor operation at a temperature in a range from −45° C. to 95° C. will be constant within a maximum deviation of 10%. In the microphone circuit 11, the operating point setting means 21 advantageously sets the voltage at the gate terminal of the MOS transistor 19 such that the concentration of the charge carriers of a first conductivity type in the inversion layer 121 is smaller by a factor in a range of 10 to 1,000 than a concentration of the charge carriers which would occur if the MOS transistor 19 were operated at the sub-voltage threshold.

Advantageously, the potential at the gate terminal of the MOS transistor 19 is set by the operating point setting means 21 such that the resistance between the source terminal and the drain terminal is higher by a factor of 10 to 1,000 than the resistance between the source terminal and the drain terminal would be if the field-effect transistor were operated at a sub-voltage threshold where the concentration of the charge carriers in the inversion layer equals the concentration of the movable charge carriers of opposite sign in the channel region.

In the microphone circuit 11, the operating point setting means 21 advantageously sets the potential at the gate terminal of the MOS transistor 19 such that the microphone capacitance 17 and the resistor between the source terminal and the drain terminal of the MOS transistor 19 form a high pass for the output signal of the sensor circuit 11, the output terminal 25 and the ground terminal 27 forming an output port. A cutoff frequency of the high pass formed in this way thus advantageously is in a range from 20 Hz to 500 Hz. At the same time, the arrangement described above of the microphone capacitance 17 and the resistor between the source terminal and the drain terminal of the MOS transistor 19 has the effect of a low pass for the noise of the resistor and/or the channel of the MOS transistor 19. Thus, the cutoff frequency advantageously is set to be far, exemplarily more than 10 Hz, below the useful bandwidth of the signal and/or the useful bandwidth of the sound signal to be converted by the microphone capacitance 17 and/or the measuring quantity to achieve high noise suppression and high sensitivity.

Furthermore, in the microphone circuit 11, any implementations of the operating point setting means 21 are conceivable as long as the operating point setting means 19 sets a potential at the gate terminal of the MOS transistor 19 such that the MOS transistor is operated in the sub-threshold voltage range while the sensor signal is generated at the output terminal 25 and/or an output voltage is applied between the output terminal 25 and the ground terminal 27. Implementations of the operating point setting means 21 in the form of a logical circuit setting the voltage between the control terminal of the MOS transistor 19 and the ground terminal to a programmed value or, exemplarily, a circuit setting the potential at the control terminal and/or gate terminal of the MOS transistor 19 such that a temperature compensation of the resistance between the source terminal and the drain terminal of the MOS transistor 19 is performed are also conceivable so that a temperature dependence of the output signal at the output terminal 25 will be reduced.

In the special embodiment 51 shown in FIG. 2, the first mirror transistor 61 and the second mirror transistor 63 may also be implemented as field-effect transistors, such as, for example, MOS transistors. In the embodiment 51 shown in FIG. 2, the constant current transistors 65a-e may be replaced by a single constant current transistor or by any number of constant current transistors.

In the embodiments of the microphone circuit 11 shown in FIG. 1, the microphone capacitance 17, the MOS transistor 19 and the operating point setting means 21 are advantageously implemented on a chip, however any implementations, like in a plurality of chips of in a discrete circuit, may be used alternatively. Advantageously, the establishing transistor 59 and the field-effect transistor 19 are implemented on a chip so that the operating point of the MOS transistor 19 can be set such that the resistance between the source terminal and the drain terminal of the MOS transistor is within predetermined tolerances, such as, for example, 10% over the entire operating range and/or range of the sensor operation of the microphone circuit 11, independently on a temperature at the MOS transistor 19 or process influences of a manufacturing process of the MOS transistor 19.

In the embodiment of the operating point setting means 21 shown in FIG. 4, the voltage source 135 is advantageously implemented such that a voltage provided by it has a linear dependence on an absolute temperature at the voltage source 135, however any voltage sources may be used alternatively. It is also conceivable to implement the voltage source 135 such that it is implemented as an ohmic resistor, such as, for example, a polysilicon resistor, coupled to a constant current source setting a voltage drop at the resistor and thus a voltage of the voltage source 135 via the current through the polysilicon resistor.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A sensor circuit for measuring a measuring quantity and for outputting an output signal indicating the measuring quantity, the sensor circuit comprising:
   a first input terminal, a second input terminal and an output terminal, wherein the output signal may be output at the output terminal;
   a capacitive sensor connected between the first input terminal and the output terminal and implemented to change a capacitance value in dependence on the measuring quantity;
   a field-effect transistor coupled to the output terminal at one of a source terminal or a drain terminal of the field-effect transistor, the field-effect transistor further coupled to the second input terminal at the other one of the source terminal or the drain terminal; and
   a driver implemented to set a potential at a control terminal of the field-effect transistor such that, in sensor operation where the output signal is generated, the field-effect transistor is operated in a sub-threshold voltage range.

2. The sensor circuit according to claim 1, wherein the driver is implemented to set the potential at the control terminal of the field-effect transistor in sensor operation such that a value of a resistance between the source terminal and the drain terminal is in a range from 100 MΩ to 1 TΩ.

3. The sensor circuit according to claim 1, wherein the driver is implemented to set the potential at the control terminal of the field-effect transistor in sensor operation such that a value of a resistance between the source terminal and the drain terminal is within predetermined tolerances independent of a temperature at the field-effect transistor or process influences of a manufacturing process of the field-effect transistor.

4. The sensor circuit according to claim 1, wherein a width of a channel region of the field-effect transistor is in a range from 100 nm to 5 μm.

5. The sensor circuit according to claim 1, wherein a length of a channel region of the field-effect transistor is in a range from 100 μm to 4,000 μm.

6. The sensor circuit according to claim 1, wherein the field-effect transistor is implemented as a MOS transistor.

7. The sensor circuit according to claim 1, wherein the capacitive sensor is implemented as a pressure sensor and the measuring quantity is a pressure at the pressure sensor.

8. The sensor circuit according to claim 1, wherein the capacitive sensor is implemented as a microphone.

9. The sensor circuit according to claim 1, wherein the capacitive sensor is implemented as an electret microphone or a silicon module microphone.

10. The sensor circuit according to claim 1, wherein the capacitive sensor and the field-effect transistor are interconnected such that in sensor operation they form an electrical high pass for the output signal, and the driver is implemented to set, in sensor operation, the potential at the control terminal of the field-effect transistor such that the high pass comprises a cutoff frequency substantially below a useful bandwidth of the measuring quantity.

11. The sensor circuit according to claim 1, wherein the capacitive sensor and the field-effect transistor are interconnected such that in sensor operation they form an electrical high pass for the output signal, and the driver is implemented to set, in sensor operation, the potential at the control terminal of the field-effect transistor such that the high pass comprises a cutoff frequency which is below a useful bandwidth of the measuring quantity by more than 10 Hz.

12. The sensor circuit according to claim 1, wherein the driver is implemented to set, in sensor operation, the potential at the control terminal of the field-effect transistor such that the resistance between the source terminal and the drain terminal is higher by a factor of 10 to 1,000 than the resistance between the source terminal and the drain terminal would be if the field-effect transistor were operated at a sub-voltage threshold.

13. The sensor circuit according to claim 1, wherein the driver is implemented to set the potential at the control terminal of the field-effect transistor such that an electrical resistance between the source terminal and the drain terminal of the field-effect transistor is constant within a deviation of 10% in sensor operation in a temperature range from −45° C. to 95° C.

14. The sensor circuit according to claim 1, wherein the driver is implemented to set the potential at the control terminal of the field-effect transistor such that when operating the field-effect transistor in the sub-threshold voltage range a concentration of the charge carriers of a first conductivity type in an inversion layer between the control terminal of the field-effect transistor and a channel region is smaller than a concentration of the charge carriers of a second conductivity type in the channel region.

15. The sensor circuit according to claim 14, wherein the driver is implemented to set the potential at the control terminal when operating the field-effect transistor in the sub-threshold voltage range such that the concentration of the charge carriers of the first conductivity type in the inversion layer is smaller by a factor in a range from 10 to 10,000 than the concentration when operating the field-effect transistor at a sub-voltage threshold.

16. The sensor circuit according to claim 1, wherein the driver comprises a driving field-effect transistor including a source terminal, a drain terminal and a control terminal, the driving field-effect transistor coupled to the control terminal of the field-effect transistor at one of the source terminal or the drain terminal of the driving field-effect transistor, said one of the source terminal or the drain terminal of the driving field-effect transistor is further coupled to the control terminal of the driving field-effect transistor, the driving field-effect transistor further coupled to a reference potential terminal at the other one of the source terminal or the drain terminal of the driving field-effect transistor, wherein the driving field-effect transistor is coupled to a current source at the one of the source terminal or the drain terminal of the driving field-effect transistor, wherein the current source is implemented to set a current through the driving field-effect transistor such that a potential at the control terminal of the field-effect transistor depends on the current provided by the current source.

17. The sensor circuit according to claim 16, wherein the current source is implemented to set a potential at the control terminal of the driving field-effect transistor via a voltage drop between the source terminal and the drain terminal of the driving field-effect transistor such that in sensor operation the driving field-effect transistor is operated in a sub-threshold voltage range.

18. The sensor circuit according to claim 16, wherein the field-effect transistor and the driving field-effect transistor are implemented on a chip.

19. The sensor circuit according to claim 16, wherein the driving field-effect transistor and the field-effect transistor are manufactured in the same technology steps and only substantially differ in a length of the channel region or a width of the channel region.

20. The sensor circuit according to claim 16, wherein a voltage source is connected between the control terminal of the field-effect transistor and the one of the source terminal or the drain terminal of the driving field-effect transistor, the voltage of the voltage source depending on a temperature of the field-effect transistor, wherein the voltage source is implemented to influence the potential at the control terminal of the field-effect transistor such that in sensor operation a resistance between the source terminal and the drain terminal of the field-effect transistor is constant within a deviation of 10%.

21. The sensor circuit according to claim 20, wherein the voltage source is implemented to set a voltage drop between the control terminal of the field-effect transistor and the one of the source terminal or the drain terminal of the driving field-effect transistor such that the voltage drop increases linearly with an absolute temperature at the field-effect transistor.

22. The sensor circuit according to claim 16, wherein the driving field-effect transistor is implemented as a MOS transistor.

23. The sensor circuit according to claim 1, wherein the driver is implemented to set a gate voltage between the control terminal of the field-effect transistor and a bulk terminal of the field-effect transistor such that in sensor operation the gate voltage is in a range above 100 mV.

* * * * *